(12) United States Patent
Hasting et al.

(10) Patent No.: US 10,234,018 B2
(45) Date of Patent: Mar. 19, 2019

(54) PLANET GEARBOX WITH CYLINDRICAL ROLLER BEARING WITH UNDER RACE LUBE SCHEME

(71) Applicant: General Electric Company, Schenectady, NY (US)

(72) Inventors: William Howard Hasting, Cincinnati, OH (US); Kenneth Lee Fisher, Schenectady, NY (US); Donald Albert Bradley, Cincinnati, OH (US); Joseph Robert Dickman, Monroe, OH (US)

(73) Assignee: General Electric Company, Schenectady, NY (US)

( * ) Notice: Subject to any disclaimer, the term of this patent is extended or adjusted under 35 U.S.C. 154(b) by 650 days.

(21) Appl. No.: 14/886,372

(22) Filed: Oct. 19, 2015

(65) Prior Publication Data

US 2017/0108113 A1    Apr. 20, 2017

(51) Int. Cl.
  *F16H 57/04* (2010.01)
  *F16H 57/08* (2006.01)
  (Continued)

(52) U.S. Cl.
  CPC ............ *F16H 57/08* (2013.01); *F01D 25/18* (2013.01); *F02C 3/04* (2013.01); *F02C 7/06* (2013.01);
  (Continued)

(58) Field of Classification Search
  CPC ........ F16H 57/08; F16H 1/28; F16H 57/0479; F16H 57/0471; F16H 57/082;
  (Continued)

(56) References Cited

U.S. PATENT DOCUMENTS 1,329,720 A    2/1920  Meier
1,436,734 A   11/1922  Stoffer
(Continued)

FOREIGN PATENT DOCUMENTS

CN    103261592 A    8/2013
CN    104204464 A   12/2014
(Continued)

OTHER PUBLICATIONS

European Search Report and Opinion issued in connection with Related EP Application No. 16190098.0 dated Feb. 7, 2017.
(Continued)

*Primary Examiner* — David J Hlavka
(74) *Attorney, Agent, or Firm* — General Electric Company; Kristi Davidson

(57) ABSTRACT

A planet gear rotatable on a planet bearing with cylindrical rollers is mounted to a carrier of an epicyclic gearing arrangement. Either the cylindrical outer surface of the support pin or the opposing cylindrical inner surface of the inner ring of the planet bearing includes a network of interconnected grooves. The support pin includes oil feed holes intersecting the grooves. Passages through the planet bearing's inner ring also connect to the grooves. A gas turbine engine includes a fan and LP shaft, which couples a compressor to a turbine. An epicyclic gearing arrangement has a single input from the LP shaft coupled to a sun gear, a single output coupled to the fan's shaft, and a planet bearing with a network of interconnected grooves.

20 Claims, 9 Drawing Sheets

(51) Int. Cl.

| | | |
|---|---|---|
| *F02C 3/04* | (2006.01) | |
| *F02C 7/36* | (2006.01) | |
| *F16H 1/28* | (2006.01) | |
| *F01D 25/18* | (2006.01) | |
| *F02K 3/06* | (2006.01) | |
| *F02C 7/06* | (2006.01) | |
| *F16C 19/28* | (2006.01) | |
| *F16C 33/60* | (2006.01) | |

(52) U.S. Cl.
CPC .................. *F02C 7/36* (2013.01); *F02K 3/06* (2013.01); *F16C 19/28* (2013.01); *F16C 33/60* (2013.01); *F16H 1/28* (2013.01); *F16H 57/0471* (2013.01); *F16H 57/0479* (2013.01); *F16H 57/0486* (2013.01); *F16H 57/082* (2013.01); *F05D 2260/40311* (2013.01); *F05D 2260/98* (2013.01); *F16H 2057/085* (2013.01)

(58) Field of Classification Search
CPC .. F16H 57/0486; F16H 2057/085; F02C 3/04; F02C 7/36; F05D 2260/98; F05D 2260/40311
See application file for complete search history.

(56) References Cited

U.S. PATENT DOCUMENTS

| | | |
|---|---|---|
| 2,652,296 A | 9/1953 | Palmgren et al. |
| 2,853,948 A | 9/1958 | Aspelin |
| 3,325,232 A | 6/1967 | Pabst et al. |
| 3,692,372 A | 9/1972 | Pineo |
| 4,177,693 A | 12/1979 | Ivanko et al. |
| 4,235,485 A | 11/1980 | Reiter |
| 4,325,589 A * | 4/1982 | Hirt .......................... F16C 17/02 384/375 |
| 4,428,628 A | 1/1984 | Brown |
| 4,479,682 A | 10/1984 | Olivier |
| 4,489,626 A * | 12/1984 | Lemon ...................... F16H 3/54 184/11.3 |
| 4,891,934 A | 1/1990 | Huelster |
| 4,968,158 A | 11/1990 | Atkinson et al. |
| 4,971,457 A | 11/1990 | Carlson |
| 5,119,905 A | 6/1992 | Murray |
| 5,121,599 A | 6/1992 | Snyder et al. |
| 5,121,815 A | 6/1992 | Franscois et al. |
| 5,272,868 A | 12/1993 | Ciokajlo et al. |
| 5,302,160 A * | 4/1994 | Fujioka ................. F16H 57/082 475/348 |
| 5,441,351 A | 8/1995 | Grunze |
| 6,058,694 A | 5/2000 | Ackerman et al. |
| 6,979,131 B1 | 12/2005 | Lippert et al. |
| 7,293,920 B2 | 11/2007 | Arena |
| 7,490,460 B2 | 2/2009 | Moniz et al. |
| 7,883,438 B2 | 2/2011 | McCune |
| 7,918,649 B2 | 4/2011 | Nakagawa et al. |
| 8,075,438 B2 | 12/2011 | Vetters et al. |
| 8,083,030 B2 | 12/2011 | Portlock |
| 8,256,576 B2 | 9/2012 | Glahn et al. |
| 8,261,527 B1 | 9/2012 | Stearns et al. |
| 8,348,803 B2 | 1/2013 | Matsuoka et al. |
| 8,393,799 B2 | 3/2013 | Dahl |
| 8,398,525 B2 | 3/2013 | Matsuoka et al. |
| 8,517,672 B2 | 8/2013 | McCooey |
| 8,535,009 B2 | 9/2013 | Hofmann |
| 8,740,464 B2 | 6/2014 | Berns |
| 8,747,272 B2 | 6/2014 | Imai et al. |
| 8,777,792 B2 | 7/2014 | Imai et al. |
| 8,869,940 B2 | 10/2014 | Johnson et al. |
| 8,968,148 B2 | 3/2015 | Matsuoka et al. |
| 8,969,148 B2 | 3/2015 | Vinet et al. |
| 8,985,277 B2 | 3/2015 | Hetherington et al. |
| 9,038,779 B2 | 5/2015 | McCune et al. |
| 2003/0236148 A1* | 12/2003 | Fox ...................... F16C 19/386 475/348 |
| 2005/0041901 A1 | 2/2005 | Yakura et al. |
| 2005/0148425 A1 | 7/2005 | Nakagawa et al. |
| 2005/0232527 A1* | 10/2005 | Matsumoto ............. F16C 19/48 384/548 |
| 2005/0250611 A1* | 11/2005 | Jurado .................. B60K 17/046 475/159 |
| 2008/0121376 A1 | 5/2008 | Schwarz et al. |
| 2010/0027932 A1 | 2/2010 | Fujiwara |
| 2010/0107648 A1 | 5/2010 | Bulin et al. |
| 2011/0030385 A1 | 2/2011 | Ellans et al. |
| 2012/0108380 A1* | 5/2012 | Dinter .................... F16C 17/26 475/159 |
| 2013/0017089 A1 | 1/2013 | Stiesdal |
| 2013/0035190 A1* | 2/2013 | McCune .................. F02C 7/32 475/159 |
| 2013/0047624 A1 | 2/2013 | Suciu et al. |
| 2013/0129269 A1 | 5/2013 | Grehn |
| 2013/0192258 A1 | 8/2013 | Kupratis et al. |
| 2013/0269479 A1 | 10/2013 | Van Der Merwe et al. |
| 2013/0318939 A1 | 12/2013 | Parnin et al. |
| 2014/0075916 A1 | 3/2014 | Augros |
| 2014/0109589 A1 | 4/2014 | Pritchard, Jr. et al. |
| 2014/0161591 A1 | 6/2014 | Venter |
| 2014/0241851 A1 | 8/2014 | Demitraszek et al. |
| 2014/0256494 A1 | 9/2014 | Lewis et al. |
| 2015/0030273 A1 | 1/2015 | Sebald et al. |
| 2015/0330498 A1* | 11/2015 | Carlino ............... F16H 57/0479 475/159 |
| 2015/0377343 A1 | 12/2015 | Fugel et al. |
| 2016/0146332 A1* | 5/2016 | Taniguchi ........... F16H 57/0479 475/5 |
| 2016/0258528 A1* | 9/2016 | Carlino ................. F16H 57/082 |
| 2016/0327148 A1* | 11/2016 | Dinter .................... F16H 57/08 |
| 2016/0341074 A1 | 11/2016 | Fang et al. |
| 2017/0089218 A1 | 3/2017 | Hasting et al. |
| 2017/0089219 A1 | 3/2017 | Hasting et al. |
| 2017/0114884 A1* | 4/2017 | Altamura ............. F16H 57/043 |

FOREIGN PATENT DOCUMENTS

| | | |
|---|---|---|
| CN | 104220729 A | 12/2014 |
| CN | 104246197 A | 12/2014 |
| DE | 10 2005 029 075 A1 | 12/2006 |
| DE | 10 2013 207 780 A1 | 8/2014 |
| EP | 1 389 671 A2 | 2/2004 |
| EP | 1574731 A2 | 9/2005 |
| EP | 2 538 055 A2 | 12/2012 |
| EP | 2 559 913 A1 | 2/2013 |
| FR | 2 970 504 A1 | 7/2012 |
| GB | 1 550 789 A | 8/1979 |
| JP | H01-110825 A | 4/1989 |
| JP | H04-318230 A | 11/1992 |
| JP | 2004-108452 A | 4/2004 |
| JP | 2007263357 A | 10/2007 |
| JP | 4211333 B2 | 1/2009 |
| JP | 2010-525234 A | 7/2010 |
| JP | 2015-514194 A | 5/2015 |
| WO | 2012/049322 A1 | 4/2012 |
| WO | 2012069274 A1 | 5/2012 |
| WO | 2012/098324 A1 | 7/2012 |
| WO | 2014/123857 A1 | 8/2014 |
| WO | 2014/123863 A2 | 8/2014 |
| WO | 2014/152347 A2 | 9/2014 |
| WO | 2014/162636 A1 | 10/2014 |
| WO | 2015/026899 A1 | 2/2015 |
| WO | 2015/055291 A1 | 4/2015 |

OTHER PUBLICATIONS

GE Related Case Form.
Fang, et al., U.S. Appl. No. 14/715,717, filed May 19, 2015.
Tompkins, et al., U.S. Appl. No. 15/364,294, filed Nov. 30, 2016.
Hasting, et al., U.S. Appl. No. 14/865,265, filed Sep. 25, 2015.
Hasting, et al., U.S. Appl. No. 14/865,239, filed Sep. 25, 2015.
Tompkins, A. M., et al., Casing for Use in a Turbofan Engine and Method of Scavenging Fluid Therefrom, GE Co-Pending Application No. 102015000078920, filed on Dec. 1, 2015.

(56) References Cited

OTHER PUBLICATIONS

Notification of Reasons for Refusal issued in connection with related JP Application No. 2016-196840 dated Dec. 19, 2017.
Search Report and Opinion issued in connection with related IT Application No. 102015000078920 dated Aug. 24, 2016.
Extended European Search Report and Opinion issued in connection with related EP Application No. 16170161.0 dated Oct. 24, 2016.
Office Action issued in connection with related CA Application No. 2928973 dated Mar. 13, 2017.
Extended European Search Report and Opinion issued in connection with corresponding EP Application No. 16193771.9 dated Mar. 23, 2017.
Extended European Search Report and Opinion issued in connection with related EP Application No. 16190097.2 dated Mar. 23, 2017.
Extended European Search Report and Opinion issued in connection with related EP Application No. 16200478.2 dated Apr. 5, 2017.
Japanese Search Report issued in connection with related JP Application No. 2016-095708 dated Apr. 21, 2017.
Notification of Reasons for Refusal issued in connection with related JP Application No. 2016-095708 dated May 9, 2017.
First Office Action and Search issued in connection with related CN Application No. 201610333609.X dated Jun. 20, 2017.
Decision to Grant issued in connection with related JP Application No. 2016-095708 dated Jul. 4, 2017.
Office Action issued in connection with related CA Application No. 2942693 dated Jul. 26, 2017.
Office Action issued in connection with corresponding EP Application No. 16193771.9 dated May 29, 2018.
Machine translation First Office action and Search issued in connection with corresponding CN Application , No. 201611272875.2 dated Oct. 24, 2018.

\* cited by examiner

PLANET GEARBOX WITH CYLINDRICAL ROLLER BEARING WITH UNDER RACE LUBE SCHEME

FIELD OF THE INVENTION

The present subject matter relates generally to a cylindrical roller bearing, or more particularly to a cylindrical roller bearing for the planet gear in an epicyclic gearbox in a gas turbine engine.

BACKGROUND OF THE INVENTION

A gas turbine engine generally includes a fan and a core arranged in flow communication with one another with the core disposed downstream of the fan in the direction of the flow through the gas turbine. The core of the gas turbine engine generally includes, in serial flow order, a compressor section, a combustion section, a turbine section, and an exhaust section. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such portion of the air is progressively compressed by the LP compressor and then by the HP compressor until the compressed air reaches the combustion section. Fuel is mixed with the compressed air and burned within the combustion section to provide combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft and the LP shaft. The combustion gases are then routed through the exhaust section, e.g., to atmosphere.

The LP turbine drives the LP shaft, which drives the LP compressor. In addition to driving the LP compressor, the LP shaft can drive the fan through a fan gearbox of an epicyclic gearing arrangement, which allows the fan to be rotated at fewer revolutions per unit of time than the rotational speed of the LP shaft for greater efficiency. The fan gearbox rotatably supports a sun gear that is disposed centrally with respect to a ring gear and a plurality of planet gears, which are disposed around the sun gear and engage between the sun gear and the ring gear. The LP shaft provides the input to the epicyclic gearing arrangement by being coupled to the sun gear, while the fan can be coupled to rotate in unison with the carrier of the planet gears or with the ring gear. Each planet gear meshes with the sun gear and with the ring gear. One of the carrier or the ring gear may be held stationary, but not both of them. Each planet gear is rotatable on its own bearing that is mounted on a support pin housed within a planet gearbox, which is fixed to the peripheral region of the carrier of the epicyclic gearing arrangement. The shaft of the fan is rotatable on its own bearing that is housed in a sun gearbox, which is also called the fan gearbox.

For any given gas turbine engine application, the planet gears are designed to provide a set reduction ratio between the rotational speed of the LP shaft and the rotational speed of the fan shaft. Because each planet gearbox that houses each planet gear is disposed within the flow path of the gas turbine engine, the challenge is to design on the one hand a reliable and robust planet gearbox that meets all flight conditions of the engine while on the other hand designing a planet gearbox that is compact sufficiently to fit inside the flow path in a way that does not require the entire engine size to be larger and heavier than otherwise would be needed in order to accommodate the planet gearbox.

Since a planetary gearbox is used as a speed reducer or increaser in transmitting power from component to component, gearbox efficiency is of primary importance. Providing proper lubrication and cooling to the planet bearings that support the planet gears is necessary to maximize the life of the planet bearings and the load capacity of the planet bearings. The amount of oil supplied to the planet bearing, however, will have an adverse effect on the efficiency of the gearbox. Thus, a lubrication scheme that affords the ability to distribute and regulate the flow of the oil to the planet bearing to help minimize the oil required to lubricate and cool the planet bearing while still providing proper lubrication and cooling to the planet bearing would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a bearing for a planet gear of the power gearbox of a gas turbine engine is provided. The power gearbox includes an epicyclic gearing arrangement that has at least two planet bearings. The LP shaft of a turbofan engine provides the rotational input to the power gearbox, and the output from the power gearbox is provided to rotate the fan shaft of the turbofan engine. In one exemplary planetary embodiment, each planet gear has an outer ring that includes a gear tooth surface that meshes with a sun gear input and a stationary ring gear to impart an output of reduced rotational speed to the carrier of the planet gears. In another exemplary star embodiment, each planet gear has an outer ring that includes a gear tooth surface that meshes with a sun gear input while the carrier is held stationary to impart an output of reduced rotational speed to the ring gear.

A cylindrical inner surface of an inner ring of each planet bearing is non-rotatably connected to a cylindrical outer surface of a support pin that is fixed to the carrier of the epicyclic gearing arrangement. In some embodiments, the teeth on each of the planet gear, the sun gear and the ring gear desirably are arranged in a double helical pattern that restrains the planet gear axially to both the sun gear and the ring gear. The planet bearing uses a plurality of cylindrical rollers, which have cylindrical outer surfaces that rotatably contact both the inner race and the outer race, which is formed by the cylindrical inner surface of the outer ring of the planet gear. The planet bearing desirably is inner-race-guided, and in some embodiments the inner ring desirably is a single piece having at least one roller track. For each respective roller track, a respective roller cage is disposed between the inner ring and the outer ring.

One of either the cylindrical outer surface of the support pin or the opposing cylindrical inner surface of the inner ring includes a network of interconnected grooves. The support pin is further defined as a hollow cylinder by a cylindrical inner surface that is disposed opposite the cylindrical outer surface and includes a plurality of oil feed holes. Each oil feed hole extends between the inner and outer surfaces of the support pin and intersects with the network of grooves that are defined in one of either the cylindrical outer surface of the support pin or the opposing cylindrical inner surface of the inner ring. Moreover, each of a plurality of passages desirably is defined through the inner ring, one end of each passage defining an inner opening through the inner surface of the inner ring wherein the inner opening is disposed in fluid communication with at least one of the grooves of the network of interconnected grooves defined in one of either the cylindrical outer surface of the support pin or the opposing cylindrical inner surface of the inner ring. The opposite end of each passage defines an outer opening through the outer surface of the inner ring, wherein the outer opening of each passage is disposed in fluid communication with at least one of the tracks defined in the outer surface of the inner ring.

In another exemplary embodiment of the present disclosure, a gas turbine engine includes a compressor section having at least one compressor and a turbine section located downstream of the compressor section and including at least one turbine. The compressor section can include a low pressure compressor and a high pressure compressor downstream of the low pressure compressor. The turbine section includes a high pressure (HP) turbine and a low pressure (LP) turbine downstream of the HP turbine. The gas turbine engine also includes a low pressure shaft mechanically coupling the low pressure compressor to the low pressure turbine via an epicyclic gearing arrangement, which includes a power gearbox that includes two or more planet gears, each planet gear being rotatably supported by a respective planet bearing as summarily described above and in more detail hereinafter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF ILLUSTRATIVE EMBODIMENTS

Figure 1:
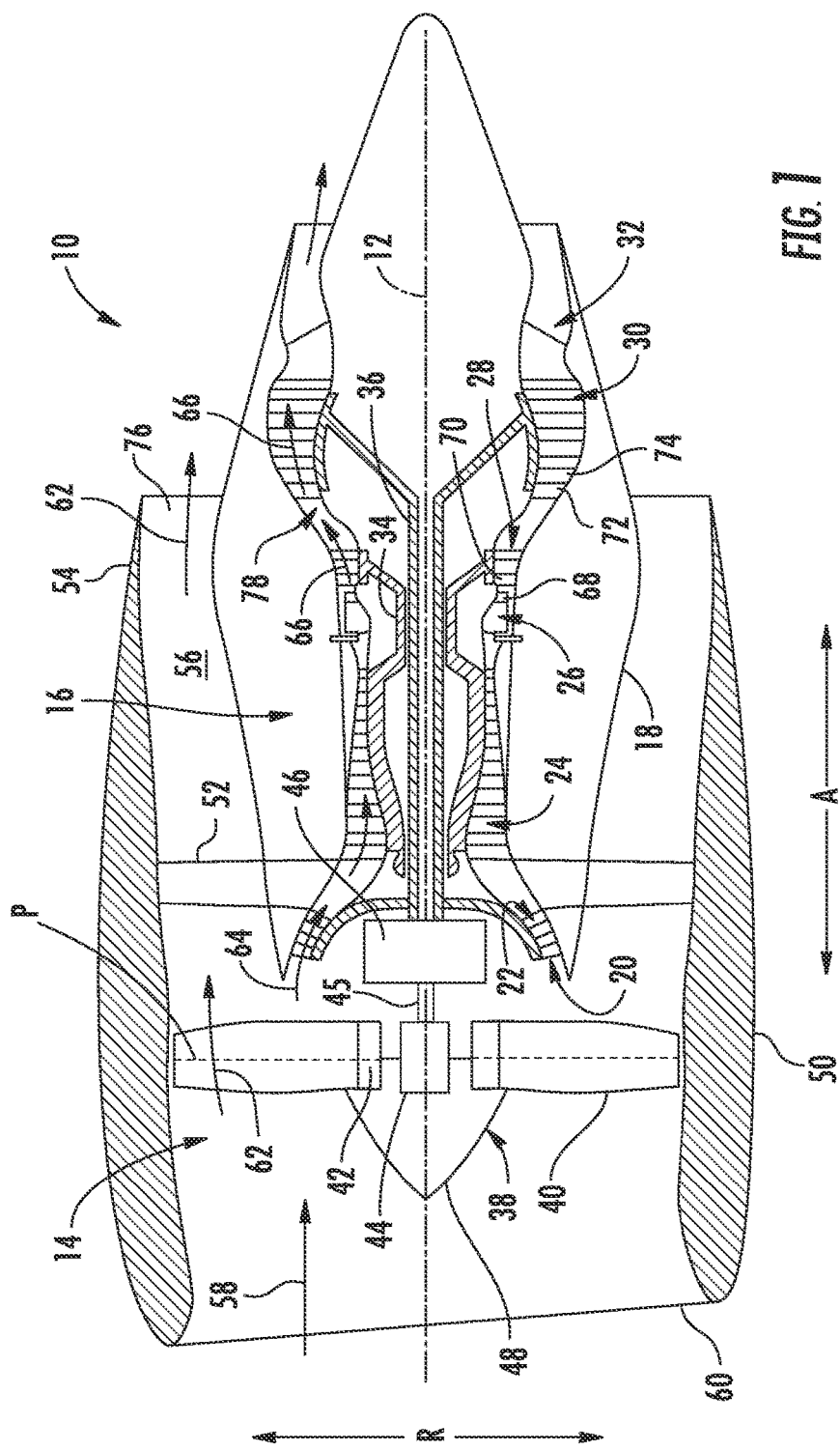
FIG. 1 is a schematic cross-sectional view of an exemplary gas turbine engine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or relative importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the fluid can be a gas such as air or a liquid such as a lubricant.

Referring now to the drawings, wherein identical numerals indicate the same elements throughout the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R that is normal to the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. As schematically shown in FIG. 1, the outer casing 18 encases, in serial flow relationship, a compressor section including a booster or low pressure (LP) compressor 22 followed downstream by a high pressure (HP) compressor 24; a combustion section 26; a turbine section including a high pressure (HP) turbine 28 followed downstream by a low pressure (LP) turbine 30; and a jet exhaust nozzle section 32. A high pressure (HP) shaft or spool 34 drivingly connects the HP turbine 28 to the HP compressor 24 to rotate them in unison. A low pressure (LP) shaft or spool 36 drivingly connects the LP turbine 30 to the LP compressor 22 to rotate them in unison. The compressor section, combustion section 26, turbine section, and nozzle section 32 together define a core air flowpath.

For the embodiment depicted in FIG. 1, the fan section 14 includes a variable pitch fan 38 having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 via a fan shaft 45 that is powered by the LP shaft 36 across a power gear box 46. The power gear box 46 includes a plurality of gears for adjusting the rotational speed of the fan shaft 45 and thus the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Alternatively, the nacelle 50 also may be supported by struts of a structural fan frame. Moreover, a downstream section 54 of the nacelle 50 may extend over an outer portion of the core turbine engine 16 so as to define a bypass airflow groove 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrow 62 is directed or routed into the bypass airflow groove 56, and a second portion of the air 58 as indicated by arrow 64 is directed or routed into the upstream section of the core air flowpath, or more specifically into the inlet 20 of the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where the highly pressurized air is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and expand through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow groove 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that in other exemplary embodiments, any other suitable LP compressor 22 configuration may be utilized. It also should be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc.

Figure 2:
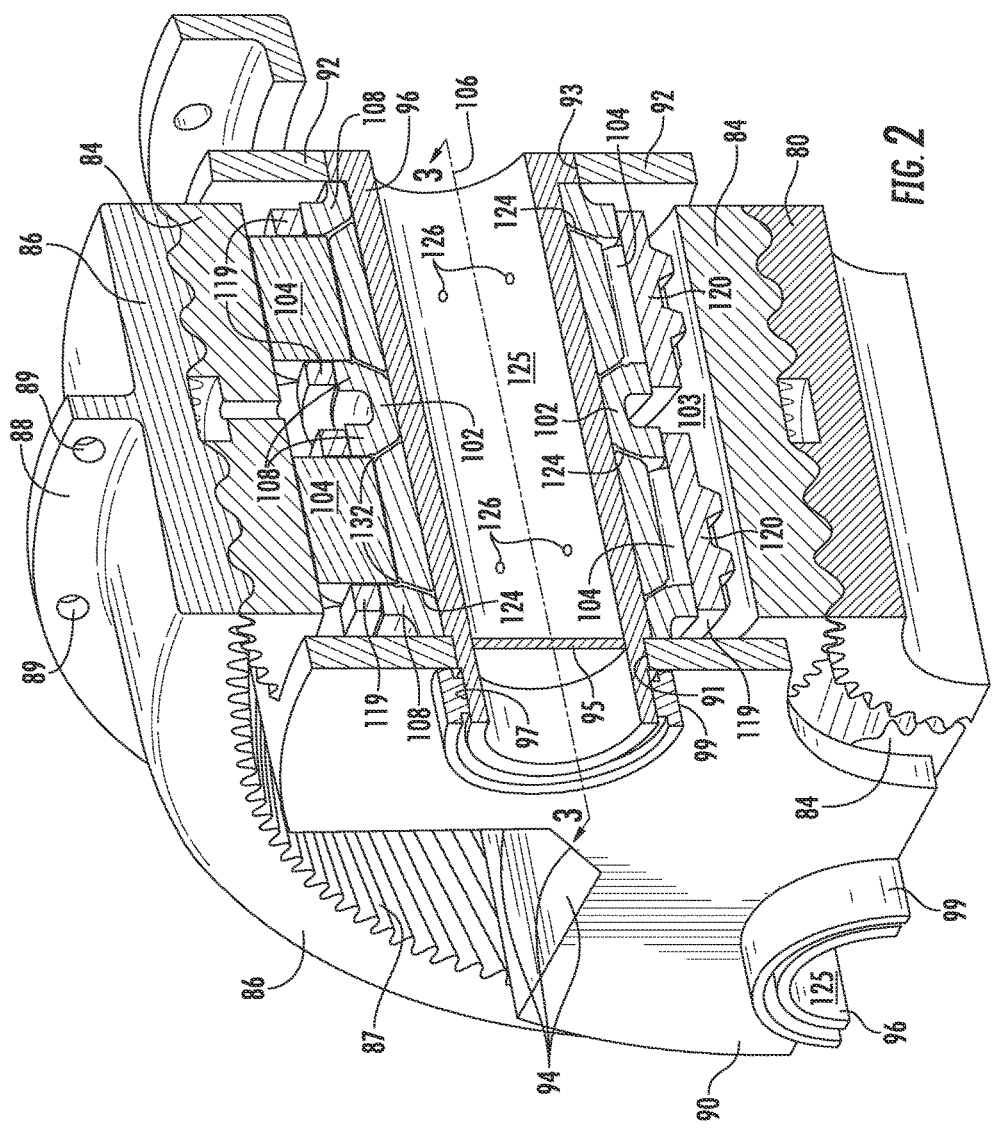
FIG. 2 is a view partially in perspective and partially in cross-section of components of a one quarter segment of an epicyclic gearing arrangement between the fan shaft and the LP shaft of the exemplary gas turbine engine of FIG. 1.

FIG. 2 depicts components of the power gearbox 46 constructed according to an aspect of the present disclosure. For purposes of illustrating features of the planet bearing that rotatably supports each planet gear, FIG. 2 schematically illustrates a view rendered partly in perspective and partly in cross-section and focused on the planet bearing components of a one quarter section of an exemplary embodiment of a planetary gearbox configuration that desirably serves as a component of the power gearbox 46 identified in FIG. 1. The power gearbox 46 is an epicyclic type and has a central axis of rotation that is coincident with the longitudinal axis 12 shown in FIG. 1 and includes four planet gears.

As schematically shown in FIG. 2 for example, the power gearbox 46 (FIG. 1) includes a centrally-located sun gear 80 that is rotatable about the longitudinal axis 12 shown in FIG. 1. The bearing that rotationally supports the sun gear 80 has been omitted from the drawings, as the bearing for the sun gear 80 is not the focus of the present disclosure. The sun gear 80 desirably has a double-helical pattern of gear teeth 81. A carrier surrounds the sun gear 80, which is rotatable with respect to the carrier. The carrier carries at least one planet gear 84 and desirably an annular array of planet gears 84, with portions of two planet gears 84 being visible in FIG. 2. In the illustrated example of the power gearbox 46 (FIG. 1) there are four planet gears 84 but varying numbers of planet gears 84 may be used. Each planet gear 84 desirably has a double helical pattern of gear teeth 85 that are configured to mesh with the gear teeth 81 of the sun gear 80.

Figure 3:
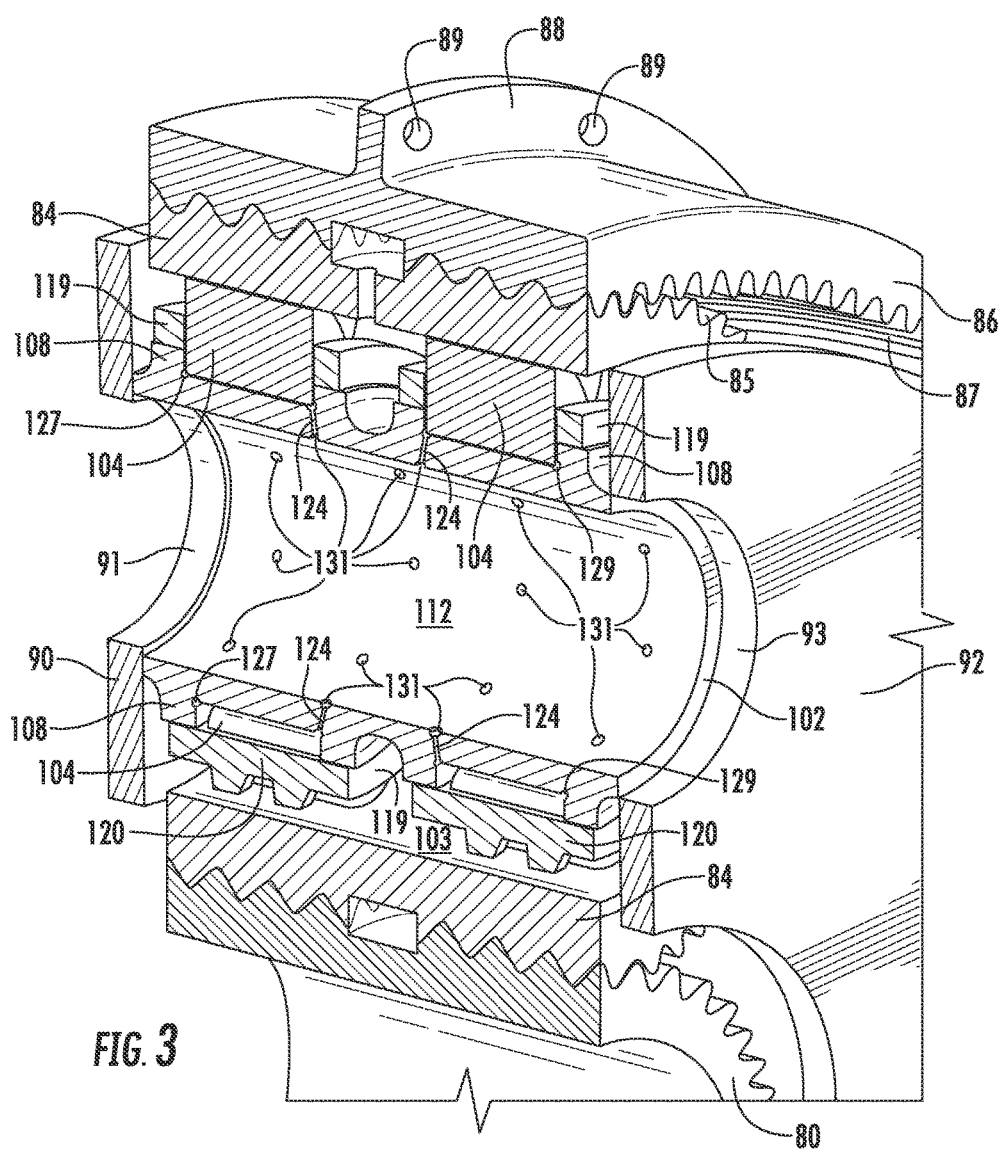
FIG. 3 is a schematic cross-sectional view of some of the components taken generally along the lines of sight designated 3-3 in FIG. 2.

As schematically shown in FIGS. 2 and 3 for example, the power gearbox 46 desirably is an epicyclic gearing arrangement having a ring gear 86 that is disposed circumferentially around the sun gear 80 and the planet gears 84. In one exemplary embodiment, the ring gear 86 that surrounds the sun gear 80 and the planet gears 84 is rendered stationary by being coupled to the outer casing 18 in a manner that is not illustrated in the drawings, as this particular arrangement can be performed in any of a number of conventional manners, any one of which being suitable for purposes of illustrating exemplary embodiments of the present disclosure. For example, the ring gear 86 can be fixed (as by being mechanically bolted or welded) to the outer casing 18 via a central circumferential flange 88 that is drilled with a plurality of axial holes 89 therethrough as shown in FIG. 2. In an alternative exemplary embodiment employing a star configuration of an epicyclic gearing arrangement, it is the carrier that is coupled to the outer casing 18, and the specifics of this coupling also are not needed for the explanation of the desired aspects of the present invention. However, in both embodiments, and as schematically shown in FIG. 3 for example, the ring gear 86 is rotatably enmeshed with each planet gear 84, which also is rotatably enmeshed with the sun gear 80, and thus the ring gear 86 also desirably has a double helical pattern of gear teeth 87 configured to mesh with the teeth 85 of the planet gear 84.

Collectively the sun gear 80, the planet gears 84, and the ring gear 86 constitute a gear train. As schematically shown in FIG. 3 for example, each of the planet gears 84 meshes with both the sun gear 80 and the ring gear 86. The sun gear 80, planet gears 84, and ring gear 86 may be made from steel alloys. One exemplary embodiment of the epicyclic gearing arrangement contemplated herein desirably is a planetary configuration that has only a single input and a single output, and the ring gear 86 is held stationary. In operation, the sun gear 80 is turned by an input that is the LP shaft, while the carrier that carries the planet gearboxes is coupled to a mechanical load that is the fan shaft 45 shown in FIG. 1. Thus, the power gearbox 46 is effective to reduce the rotational speed of the sun gear 80 in a known manner to a rotational speed appropriate for the load coupled to the carrier, namely, rotation of the fan shaft 45.

Each of the planet gears 84 is rotatably carried by a bearing that in turn is carried by a planet gearbox that in turn is carried by the carrier. The construction and mounting of the bearing for one planet gear 84 will be described with the understanding that each of the planet gears 84 is constructed and mounted identically, though to different points on the carrier.

Figure 7:
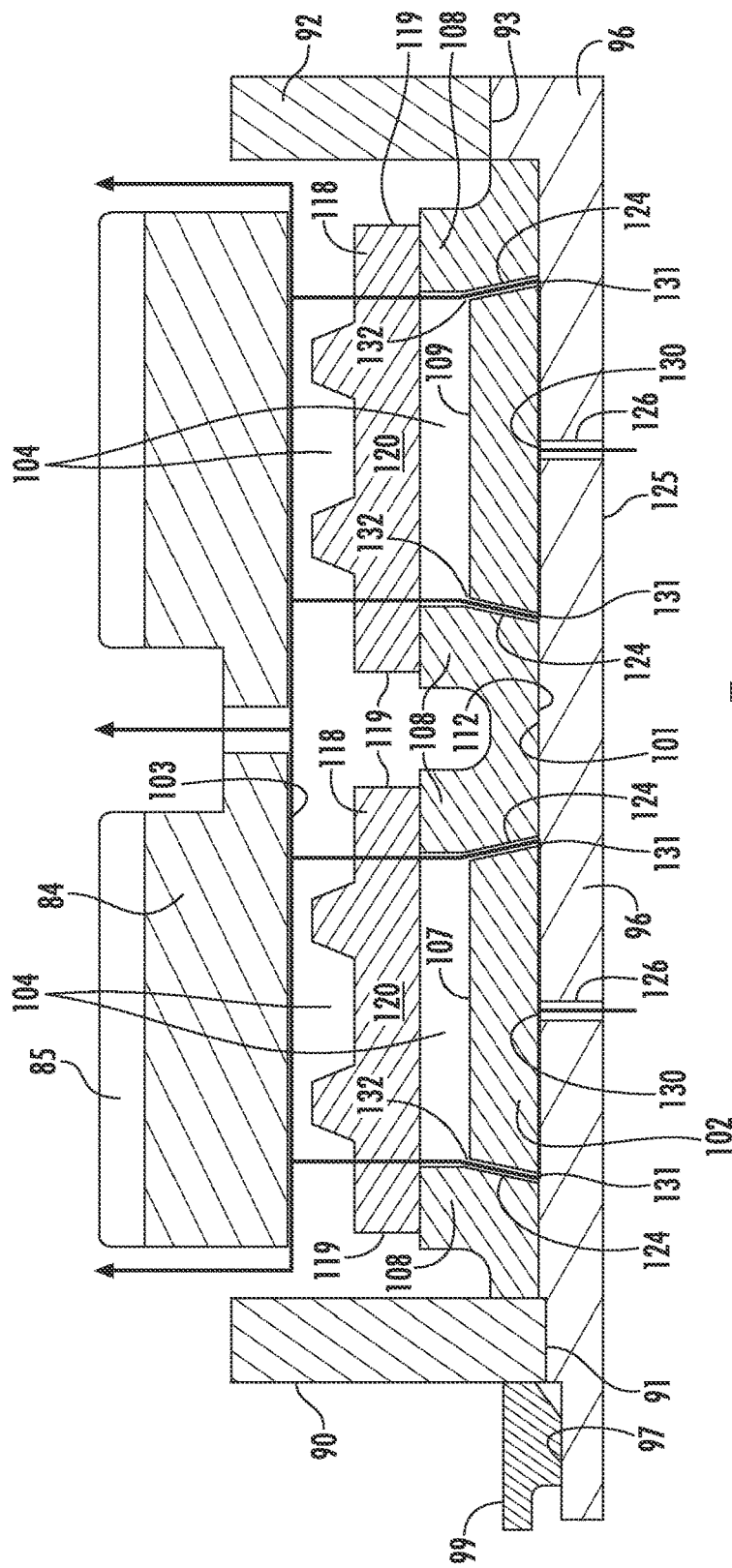
FIG. 7 is a schematic representation of the flow of lubricating oil from the support pin through the planet gear of an embodiment of the planet gearbox of an epicyclic gearing arrangement of FIG. 2.

As schematically shown in FIGS. 2 and 7 for example, the carrier includes a forward wall 90 and an aft wall 92 spaced axially apart from the forward wall 90 and together forming part of the carrier of each planet gearbox. As schematically shown in FIG. 7, each of the forward wall 90 and the aft wall 92 respectively defines therethrough a respective coaxial bore 91 and 93. As schematically shown in FIG. 2, the carrier desirably includes a plurality of sidewalls 94 that extend axially between and connect the forward and aft walls 90, 92 of the carrier. Desirably, pairs of the sidewalls 94 are disposed on opposite sides of the coaxial bores 91, 93 defined respectively in the respective forward and aft walls 90, 92 of the carrier.

In one exemplary embodiment employing a planetary configuration of an epicyclic gearing arrangement, the carrier is non-rotatably coupled to the fan shaft 45 in a conventional manner so that they rotate in unison at the same speed, but the manner of this coupling is not critical to an understanding of the present disclosure and thus need not be further discussed. In an alternative embodiment employing a star configuration of an epicyclic gearing arrangement, it is the ring gear 86 that is non-rotatably coupled to the fan shaft 45 in a conventional manner so that they rotate in unison at the same speed, but the manner of this coupling is not critical to an understanding of the present disclosure and thus need not be further discussed.

As shown in FIGS. 2, 5, 6, 7 and 8 for example, a support pin 96 is hollow, generally cylindrical, and has forward and aft ends. The support pin 96 is provided to mount the bearing of the planet gear 84 to the carrier and thus is configured to be fixed to the carrier. As shown in FIG. 2 for example, each opposite end of the support pin 96 is received in one of the bores 91 and 93 defined in the carrier. As shown in FIG. 2 for example, the forward end of the support pin 96 includes a threaded, reduced-diameter surface 97, while the aft end includes an annular, radially-outwardly-extending flange 98. A retainer 99 (in this example a threaded locknut) engages the reduced-diameter surface 97 at the forward end to secure the support pin 96 in position against rearward axial movement.

Figure 5:
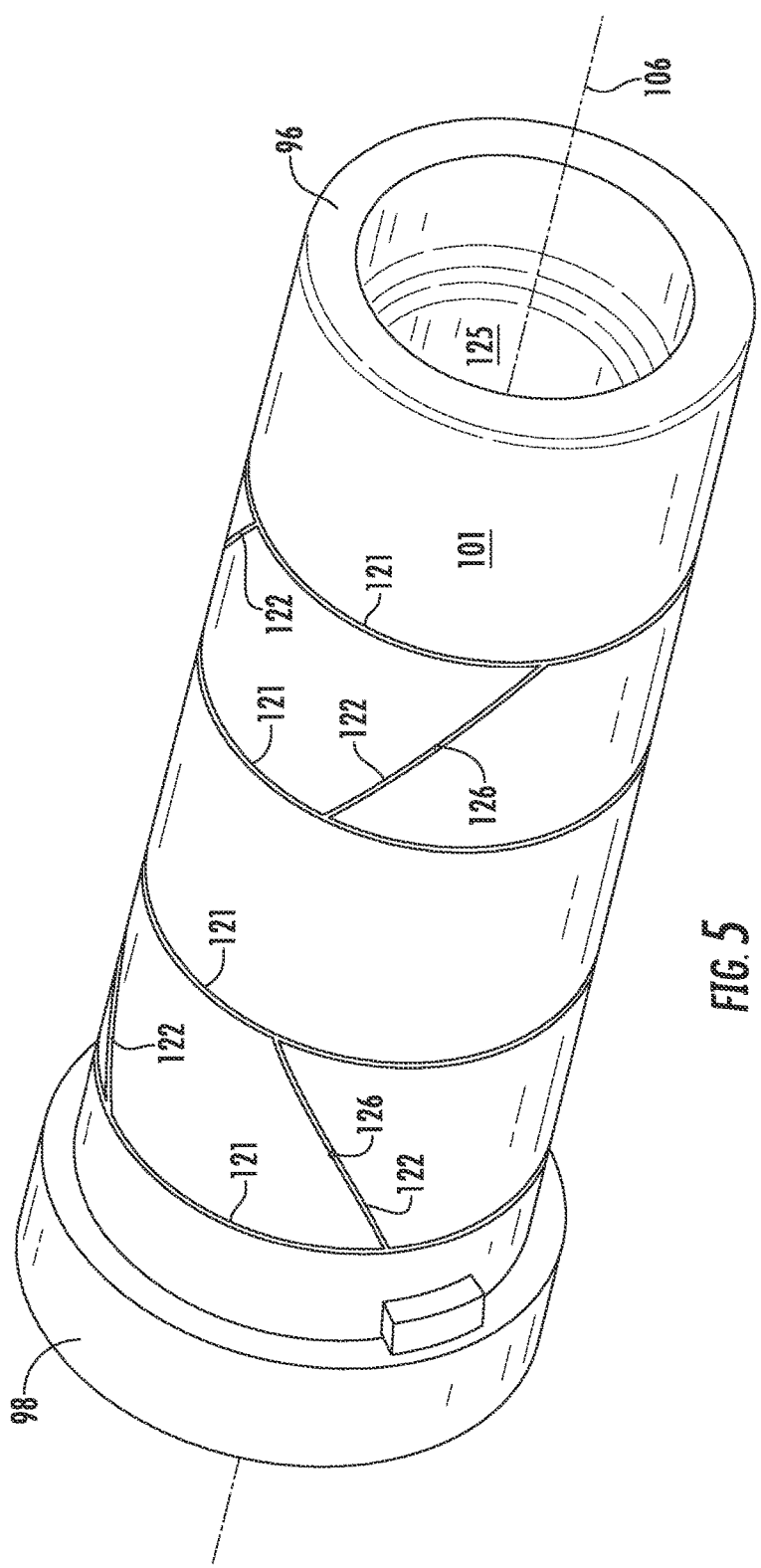
FIG. 5 is an elevated perspective view of disassembled exemplary components of the exemplary gearing arrangement of FIG. 2.
Figure 8:
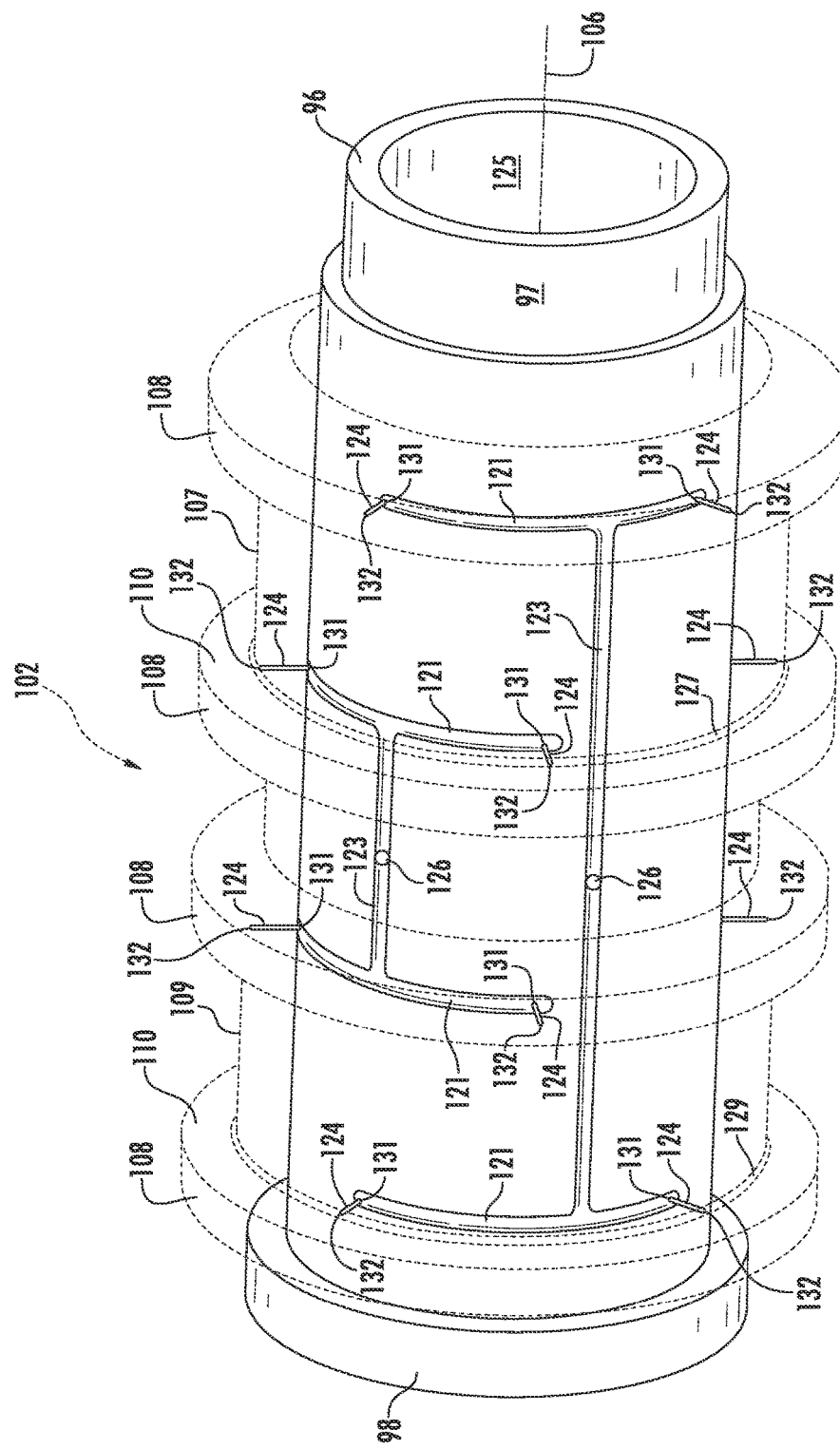
FIG. 8 is a schematic representation of the fluid communication between exemplary embodiments of grooves in the outer surface of the support pin and exemplary embodiments passages through the inner ring (shown in dashed outline) of a planet bearing of an epicyclic gearing arrangement.

As schematically shown in FIGS. 2, 5, 6, 7 and 8 for example, the support pin 96 defines a cylindrical outer surface 101. As schematically shown in FIGS. 5 and 8 for example, the cylindrical outer surface 101 of the support pin 96 is disposed radially equidistant from a central axis 106 that extends in an axial direction through the support pin 96. This central axis 106 also defines the axis of rotation for the planet gear 84. As schematically shown in FIGS. 5, 6, 7 and 8 for example, the support pin 96 is further defined as a hollow cylinder by a cylindrical inner surface 125 disposed opposite the cylindrical outer surface 101. As shown in FIG. 2 for example, the forward end of the support pin 96 is completely closed off by a forward wall 95 that defines part of an internal cavity defined in the support pin 96. Though only half of the forward wall 95 is visible in the cross-sectional view depicted in FIG. 2, this forward wall 95 extends completely across the forward end of the support pin 96.

As shown in FIGS. 2, 5, 6, 7 and 8 for example, the support pin 96 desirably includes a plurality of oil feed holes 126 formed therethrough. Each oil feed hole 126 extends through the support pin 96 between the cylindrical inner surface 125 and the cylindrical outer surface 101 of the support pin 96. As schematically shown in FIG. 7 for example, each oil feed hole 126 desirably extends in a radial direction from the cylindrical inner surface 125 to the cylindrical outer surface 101 of the support pin 96. As schematically shown in FIG. 7 for example, each oil feed hole 126 defines an exit opening 130 at the outer surface 101 of the support pin 96. These feed holes 126 are sized to meter a controlled flow of oil for lubricating and cooling the planet bearing.

In operation, oil is fed under pressure through the opening at the aft end of the support pin 96 and into the internal cavity of the hollow support pin 96 defined in part by the forward wall 95 disposed opposite the opening at the aft end of the support pin 96 and shown in FIG. 2 for example. The oil entering this internal cavity of the support pin 96 flows under pressure from the internal cavity radially outwardly through such oil feed holes 126. In a dual track embodiment shown in FIG. 2 for example, there typically would be provided four oil feed holes 126 disposed circumferentially around the support pin and equidistantly apart from one another (90 degree intervals) for each of the tracks of the planet bearing. With oil pressure within the internal cavity of the support pin of around 65 pounds per square inch, each of the four oil feed holes 126 for each track desirably would have a diameter of about 0.039 inch to yield an oil flow of about 1.1 gallons per minute being metered from the internal cavity of the support pin 96 to the planet bearing.

As described more fully below, the oil flows out of the exit openings 130 and into a network of grooves formed in one of the outer surface 101 of the support pin 96 and the inner surface 112 of the inner ring 102 (described below), providing both cooling and lubrication to the planet bearing. As the pressure at which this oil is provided to the hollow oil cavity defined by the cylindrical inner surface 125 of the support pin 96 can vary according to the particular planet gear 84 and engine 10, the oil feed holes 126 through the support pin 96 will be sized accordingly in order to ensure the proper flow rate of the oil at the available oil pressure in order to supply adequate lubrication and cooling to the planet bearing.

Figure 4:
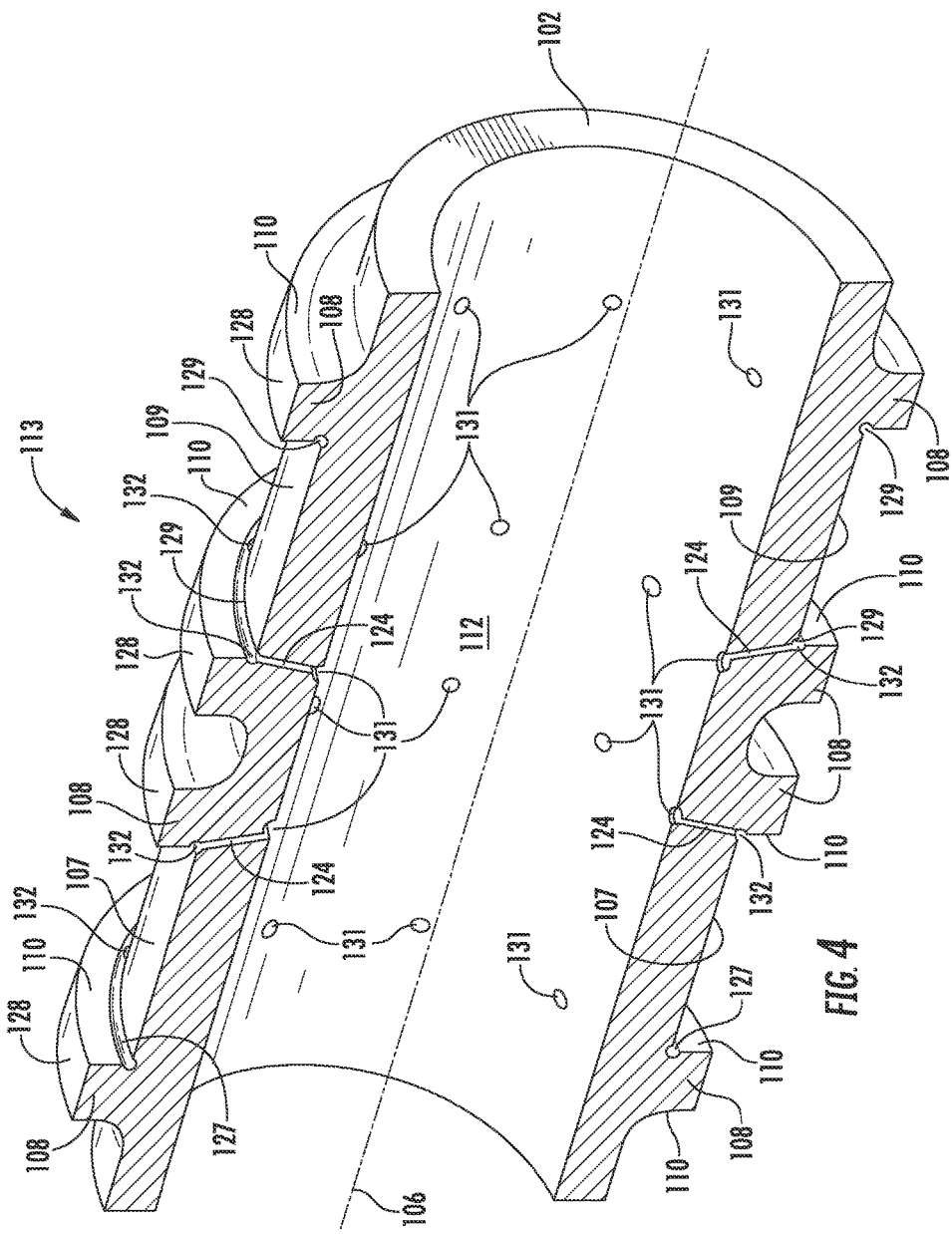
FIG. 4 is a schematic representation that is partially a perspective view and partially a cross-sectional view of a disassembled bearing component taken generally along the lines of sight designated 3-3 in FIG. 2.
Figure 9:
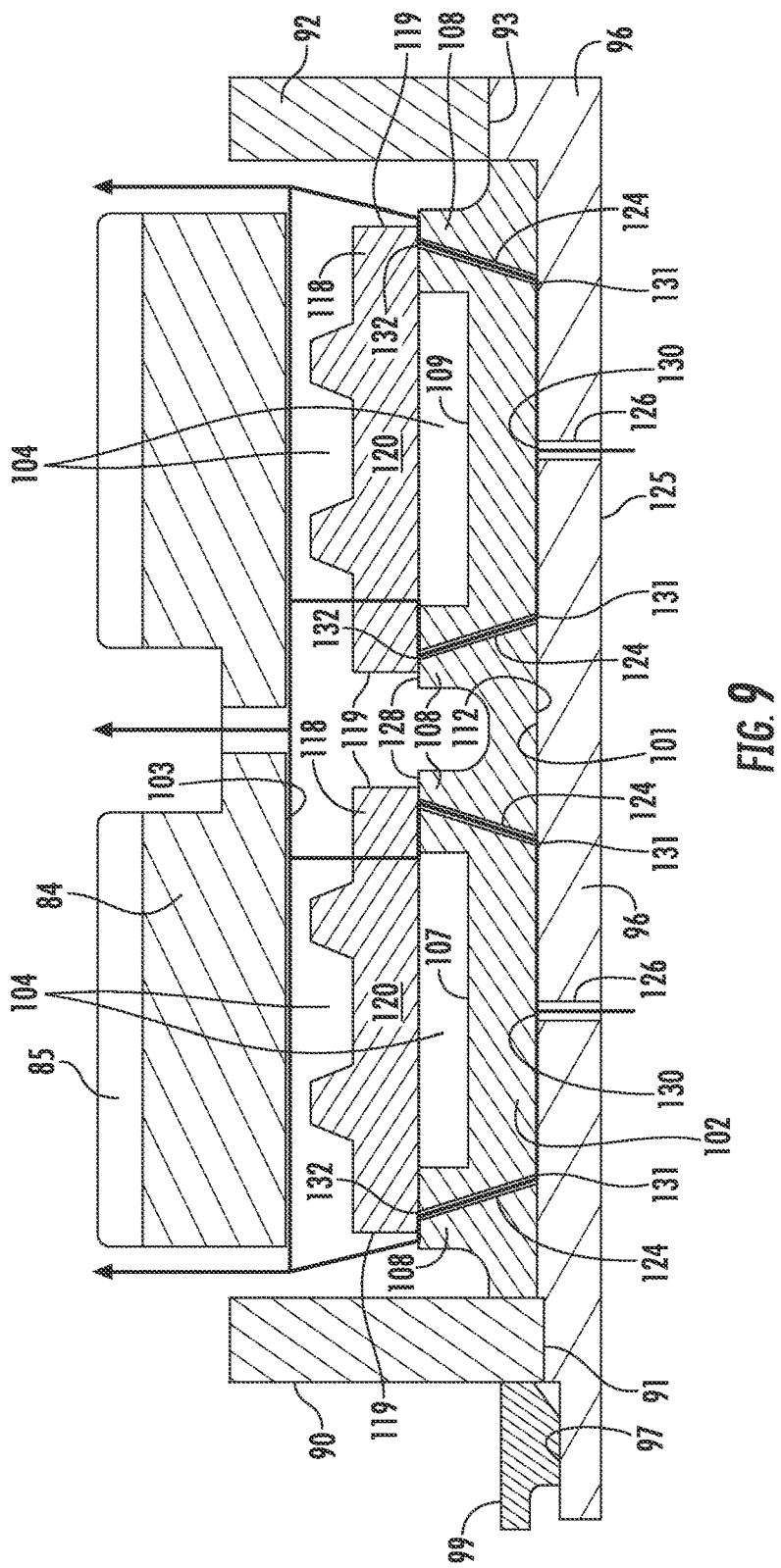
FIG. 9 is a schematic representation of an alternative flow of lubricating oil from the support pin through sections of the planet gear of a planet gearbox of an epicyclic gearing arrangement.

As shown in FIGS. 2, 3 and 4 for example, the planet bearing includes an inner ring 102. FIG. 4 is a schematic representation of a half section of an inner ring 102 that is partially a perspective view and partially a cross-sectional view. As shown in FIG. 4 for example, the inner ring 102 defines a cylindrical inner surface 112. As schematically shown in FIGS. 7 and 9 for example, the cylindrical inner surface 112 of the inner ring 102 is non-rotatably connected to the cylindrical outer surface 101 of the support pin 96. Desirably, the inner cylindrical surface 112 of the inner ring 102 is press-fitted to the cylindrical outer surface 101 of the support pin 96.

Desirably, the planet bearing desirably is inner-race-guided and formed as a single, unitary component. As shown in FIG. 4 for example, the single component inner ring 102 desirably has disposed opposite the inner surface 112 thereof, an outer surface 113 that defines at least one roller track that defines at least one roller raceway 107, 109 constituting an inner race of the planet bearing. In a dual track embodiment, each one of the pair of tracks that is defined in the inner ring 102 is separated in the axial direction from the other one of the pair of tracks. In the dual track embodiment, the outer surface 113 of the inner ring 102 defines two roller raceways 107, 109 disposed side-by-side and separated from each other in the axial direction A, which is parallel to the rotational axis 106 of the planet gear 84. Each of the roller raceways 107, 109 functions as an inner race 107, 109 of the dual track planet bearing. As shown in FIG. 4 for example, each of the pair of tracks extends circumferentially around the outer surface of the inner ring 102. Each of the pair of tracks is disposed parallel in the circumferential direction with respect to the other track in the pair of tracks.

As shown in FIG. 4 for example, each respective track is defined by a pair of guiderails 108, which are spaced apart from each other in the axial direction A and extend circumferentially around the inner ring 102. As contemplated herein, the inner ring 102 can include a single track or a plurality of tracks such as a dual track inner ring 102 or a triple track inner ring 102, etc. However, explanation of the structure and operation of the planet gearbox herein will use the specific example of a dual track inner ring 102, thus informing how additional tracks would be accommodated or a single track would remain after the elimination of one of the dual tracks.

Accordingly, as shown in FIG. 4 for example, in a dual track embodiment, the outer surface 113 of the inner ring 102 incorporates two pairs of guiderails 108, which extend continuously in the circumferential direction around the inner ring 102. Each of the pair of tracks defines a surface in the form of a raceway 107 or 109 that extends circumferentially and concentrically with respect to the cylindrical inner surface 112 of the of the inner ring 102. Each pair of guiderails 108 defines one of the two annular inner races 107, 109, a forward raceway 107 and an aft raceway 109, respectively, axially spaced apart from each other. Thus, each track includes a respective raceway 107, 109 that provides the surface that contacts the cylindrical outer surface 114 of each of the plurality of rollers 104 (FIG. 3), which are rotatably disposed within the respective track of the inner ring 102. The use of a single inner ring 102 with dual raceways 107, 109 spaced axially apart from each other provides for good concentricity between sets of rollers 104, but two separate inner rings 102 could be used as well. The axial dimension of the inner ring 102 desirably is sized so that the inner ring 102 cannot move axially relative to the opposing and axially spaced apart walls 90, 92 of the carrier.

As schematically shown in FIG. 4 for example, each guiderail 108 includes an exterior surface 128 that extends continuously in the circumferential direction around the outer surface 113 of the inner ring 102 and is disposed radially outwardly from a respective annular raceway 107, 109 defined in the outer surface 113 of the inner ring 102. The exterior surface 128 of each guiderail 108 defines the largest diametric dimension of the outer surface 113 of the inner ring 102 and provides respective guiding surfaces to each respective roller cage 118 (described more fully below).

As schematically shown in FIG. 4 for example, each guiderail 108 is further defined in part by an interior sidewall 110 that runs along one of two circumferentially extending extreme edges of the respective raceway 107, 109. Thus, the guiderails 108 of each of the pair of tracks in a dual track embodiment of the inner ring 102 define a respective pair of radially extending interior sidewalls 110 that are spaced apart in the axial direction from each other. Each interior sidewall 110 of each guiderail 108 of an individual track extends radially between a respective extreme edge of the respective raceway 107, 109 and a respective one of the interior free edges of the exterior surface 128 of a respective guiderail 108. The respective interior sidewalls 110 of each pair of guiderails 108 define the two extreme edges of one of the pair of raceways 107, 109 that form part of one of the pair of tracks that are defined in the outer surface 113 of the dual track inner ring 102.

As schematically shown in FIG. 4 for example, a respective undercut channel 127, 129 extends circumferentially around each of the two respective extreme edges of the respective raceway 107, 109. Each respective undercut 127, 129 is defined between one of the two the respective extreme edges of the respective raceway 107, 109 and the respective interior sidewall 110 extending from the respective extreme edge of the respective raceway 107, 109. Each respective undercut 127, 129 defines a respective corner relief at each extreme edge of the respective track where the respective interior sidewall 110 meets the respective extreme edge of the respective raceway 107, 109.

As shown in FIGS. 2 and 7 for example, the planet gear 84 desirably is a single-piece component that forms both the outer race 103 and the gear tooth surface 85 of the planet bearing. The cylindrical interior surface 103 of the planet gear 84 of the planet bearing contacts and retains the rollers 104 of the planet bearing. Thus, an outer cylindrical surface of the outer ring 84 of the planet bearing is defined by a gear tooth surface 85 that is configured to mesh with both the gear tooth surface 81 of the sun gear 80 and the gear tooth surface 87 of the ring gear 86. Desirably, as shown in FIG. 2 for example, the gear tooth surface 85 of each cylindrical outer ring 84 is patterned with a double helical gear tooth surface with the bias of each one of the two double helical gear tooth surfaces of the outer ring 84 being disposed nonparallel with the other one of the two double helical gear tooth surfaces of the outer ring 84.

As shown in FIG. 2 for example, a plurality of cylindrical rollers 104 is disposed between the inner ring 102 and the cylindrical interior surface 103 of the planet gear 84 that serves as the outer race 103 of the planet bearing. As schematically shown in FIG. 3 for example, each of the pair of tracks in the inner ring 102 is configured to receive and rotatably guide therein a respective plurality of cylindrical rollers 104, which are free to rotate relative to both the inner raceways 107, 109 and the outer race 103 of the planet bearing. As shown in FIG. 2 for example, the inner cylindrical surface 103 of the outer ring 84 of the planet bearing rotatably contacts both the first plurality of cylindrical rollers 104 and the second plurality of cylindrical rollers 104.

Thus, in the dual track embodiment of the inner ring 102, the raceways 107, 109 of the inner ring 102 receive rollers 104, in two tandem rings. A first plurality of cylindrical rollers 104 is rotatably disposed on the forward raceway 107 within a first one of the pair of tracks of the inner ring 102. Similarly, a second plurality of cylindrical rollers 104 is rotatably disposed on the aft raceway 109 within a second one of the pair of tracks of the inner ring 102. Thus, the raceways 107, 109 of the inner ring 102 contact a portion of each of the cylindrical outer surfaces 114 of the cylindrical rollers 104 disposed in the respective track. The cylindrical rollers 104 can comprise a ceramic material of a known composition, for example silicon nitride (Si.sub.3Ni.sub.4).

In the exemplary dual track embodiment of the inner-race-guided planet gearbox illustrated in the FIGs., two separate roller cages 118 desirably are disposed between the inner ring 102 and the outer ring 84. Each roller cage 118 is free to rotate with respect to both the inner ring 102 and the outer ring 84, but at a different speed than the speed of rotation of the outer ring 84. In the embodiment schematically shown in FIG. 7 for example, because the inner ring 102 has side-by-side dual tracks, a separate roller cage 118 is provided over each of the dual tracks. Each roller cage 118 defines its own circumferential row of generally rectangular openings disposed above a respective track of the pair of tracks of the inner ring 102. As schematically shown in FIG. 7 for example, a first roller cage 118 defines a first circumferential row, and a second roller cage 118 defines a second circumferential row separated in the axial direction from the first circumferential row.

Each circumferential row in each roller cage 118 defines a plurality of generally rectangular openings. Each generally rectangular opening of the roller cage 118 is defined by a major axis in the axial direction and a minor axis in the circumferential direction. As shown in FIG. 2 for example, each generally rectangular opening of the roller cage 118 is bounded by a parallel pair of opposing and spaced apart web elements 120 that elongate in the axial direction. As shown in FIG. 3 for example, each generally rectangular opening of the roller cage 118 is bounded by a pair of opposing, parallel and spaced apart shoulder elements 119 that elongate in the circumferential direction. As shown in FIG. 7 for example, respective web elements 120 of each roller cage 118 are disposed to extend axially between the opposing shoulder elements 119 of the roller cage 118. All of the webs 120 of both roller cages 118 are identically configured and dimensioned. Each roller cage 118 is configured with circumferentially extending shoulder elements 119 and axially extending web elements 120 to maintain in each respective track with its respective raceway 107, 109 of the inner ring 102, a respective separation in the circumferential direction between each respective cylindrical roller 104 in each pair of circumferentially adjacent cylindrical rollers 104 in that respective track.

The major axis of each generally rectangular opening of each roller cage 118 is configured to accommodate the length L of an individual roller 104, while the minor axis of each generally cylindrical opening is configured to accommodate the diameter D of an individual roller 104. The openings in each row are spaced equidistantly apart circumferentially around the roller cage 118 with the number of openings in each row being equal to the number of cylindrical rollers 104 disposed in the respective one of the pair of tracks disposed beneath the respective row of the roller cage 118. Accordingly, as shown in FIG. 2 for example, each respective cylindrical roller 104 is disposed with its cylindrical outer surface 114 extending through a respective opening defined by the roller cage 118.

As shown in FIGS. 2 and 7 for example, each respective shoulder element 119 of each roller cage 118 is disposed above a respective guiderail 108 of the inner ring 102 with a close clearance between the two respective opposing surfaces of the shoulder element 119 and the guiderail 108. Because the planet bearing is inner-race-guided, the roller cage 118 is designed with a close clearance between the cylindrically-shaped, circumferential inner surface defined by the shoulder elements 119 of the cage 118 and the cylindrically-shaped, circumferential outer surfaces 128 of the guiderails 108 of the inner ring 102, and this close clearance desirably is on the order of 0.005 to 0.050 inches inclusive.

In accordance with an aspect of the present invention, FIGS. 5 and 8 illustrate a network of interconnected grooves that are defined in at least one of the cylindrical outer surface 101 of the support pin 96 or the cylindrical inner surface 112 of the inner ring 102. In accordance with an aspect of the present invention, each oil feed hole 126 through the support pin 96 is disposed to intersect with the network of interconnected grooves. Rather than have the oil feed holes 126 extend radially in direct alignment with passages 124 in the tracks of the inner ring 102 that supply lubricating oil to the rollers 104, the network of interconnected grooves of the present invention distributes this supply of oil to the inner surface 112 of the inner ring 102 to take advantage of the cooling effect of this oil before it reaches the tracks of the inner ring 102. The locations of the intersections of the oil feed holes 126 with the network of interconnected grooves 121, 122, 123 will depend on the particular pattern of the network of interconnected grooves 121, 122, 123, and these intersecting locations desirably are chosen to ensure that the oil flow is equally distributed to the various passages 124 that conduct the oil through the inner ring 102 and into the tracks of the inner ring 102. In so doing, the amount of oil needed for cooling can be reduced without diminishing the lubricating effect of the oil once it reaches the tracks of the inner ring 102. Thus, the network of interconnected grooves of the present invention makes more efficient use of the oil that is needed for lubrication by maximizing the cooling effect of the oil on the planet bearing as the oil is directed from the internal cavity of the support pin 96 through the oil feed holes 126 and the network of interconnected grooves 121, 122, 123 to the tracks of the inner ring 102.

FIGS. 7 and 9 are schematic representations of possible paths for the flow of lubricating oil from the support pin 96 through the planet gear of embodiments of the planet gearbox. In FIGS. 7 and 9, the heavy solid lines schematically represent the path that the oil takes for lubrication and cooling purposes. The heavy lines between the outer surface 101 of the support pin 96 and the inner surface 112 of the inner ring 102 are representative of the oil that flows through the network of interconnected grooves 121, 122 and 123, which intersect with the inner openings 131 of the passages 124. As shown in FIG. 7, some or all of these passages 124 can empty into the undercut channels 127, 129 in the tracks of the inner ring 102. As shown in FIG. 9, some or all of these passages 124 can pass through the guiderails 108 of the roller cage and empty into the close clearance between the two respective opposing surfaces of the guiderail 108 and the shoulder element 119 of the roller cage 118. Moreover, the disposition of the passages 124 depicted in FIG. 7 and the disposition of the passages 124 depicted in FIG. 9 can be provided in different combinations, which can differ both in the relative number of each type of disposition of these passages 124 and in the relative positioning of each type of disposition of these passages 124, either emptying into the undercut channels 127, 129 or emptying out of the guiderails 108 of the inner ring 102 and into the close clearance between the two respective opposing surfaces of the shoulder element 119 and the guiderail 108.

Each of FIGS. 5 and 8 schematically illustrates a different pattern of a network of grooves defined in the cylindrical outer surface 101 of the support pin 96. Similarly, the dashed lines in FIG. 6 schematically illustrate an exemplary pattern of a network of grooves defined in the cylindrical inner surface 112 of the inner ring 102.

Figure 6:
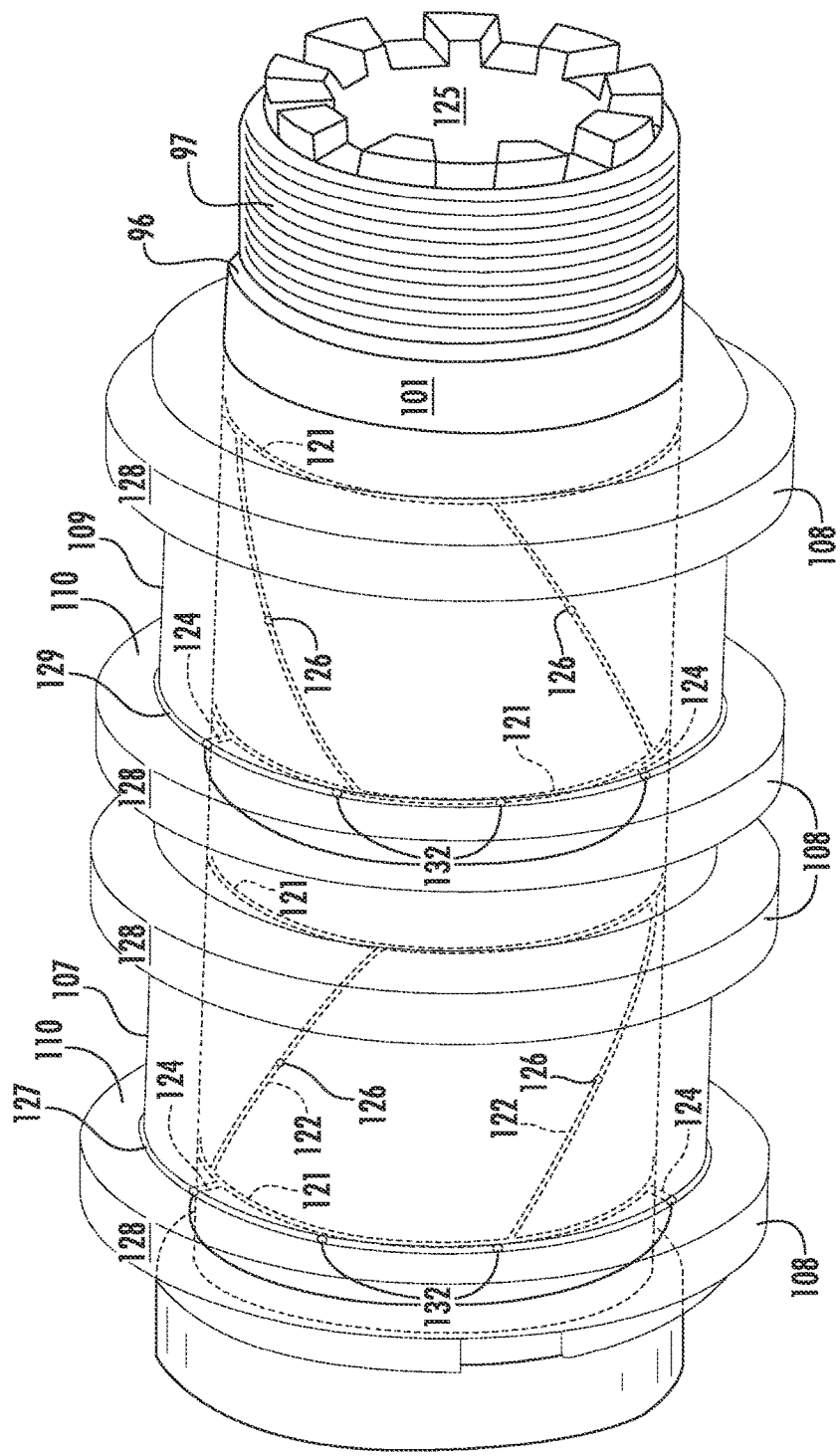
FIG. 6 is an elevated perspective view of disassembled exemplary components of the exemplary gearing arrangement of FIG. 2 with a schematic representation of certain features otherwise hidden from the viewer and shown in dashed line.

As schematically shown in FIGS. 5, 6 and 8 for example, an exemplary embodiment of the network of interconnected grooves desirably includes a plurality of circumferentially extending grooves 121, and at least one of the circumferentially extending grooves 121 extends in a direction that is normal to the central axis 106. As schematically shown in FIGS. 5 and 6 for example, in an embodiment of an exemplary network of interconnected grooves, at least one of the circumferentially extending grooves 121 extends completely around the circumference of one of the cylindrical outer surface 101 of the support pin 96 (FIG. 5) and the cylindrical inner surface 125 of the inner ring 102 (FIG. 6).

As schematically shown in FIGS. 5 and 6 for example, an exemplary embodiment of the network of interconnected grooves desirably can include at least one helically-shaped groove 122, which includes an axially extending groove 122 that extends in a direction that is not parallel to the central axis 106. At least one of the helically-shaped grooves 122 in the network of interconnected grooves desirably intersects a circumferentially extending groove 121 interconnected on each of the opposite ends of the helically-shaped groove 122.

As schematically shown in FIG. 8 for example, an exemplary embodiment of the network of interconnected grooves desirably can include a plurality of H-shaped grooves. Each H-shaped groove defines a pair of circumferentially extending grooves 121 and an axially extending groove 123 that extends axially in a direction that is parallel to the central axis 106. Each H-shaped groove desirably includes a circumferentially extending groove 121 interconnected on each of the opposite ends of a respective axially extending groove 123 that extends in a direction that is parallel to the central axis 106. Moreover, in at least one H-shaped groove, each of the circumferentially extending grooves 121 in the pair of circumferentially extending grooves 121 desirably does not extend completely around the circumference of one of the cylindrical outer surface 101 of the support pin 96 and the cylindrical inner surface 125 of the inner ring 102.

Other patterns may be chosen for the network of interconnected grooves 121, 122, 123, depending upon the number of tracks in the inner ring 102 and the desired distribution of the flow of oil deemed desirable for purposes of lubrication and cooling of the planet bearing. For example, two helical grooves 122 can be directed at intersecting angles and joined at the point of intersection to form an acute angle resembling the pain vertex of an isosceles triangle, and a plurality of these pairs of helical grooves 122 can be disposed along substantially the entire length of either the support pin 96 or the inner ring 102. In similar examples, two helical grooves 122 can be directed at intersecting angles and joined at the point of intersection to form an acute angle, and this acute angle can be joined to another similarly configured pair of helical grooves 122 by a circumferential groove 121 with the oil feed hole 126 disposed at the midpoint of the circumferential groove 121. Another network might include a pair of axial grooves 123 spaced apart in the circumferential direction and connected by at least one helical groove 122 and alternatively a plurality of helical grooves 122, and in each case including an oil feed hole 126 disposed at the midpoint of each helical groove 122. The pair of axial grooves 123 can extend substantially the entire length of the inner ring 102 or only a short section thereof. Moreover, in each of the foregoing examples, the pitch of the helical grooves 122 can be adjusted from about 60° with respect to the axial direction A to about 25° with respect to the axial direction A. Accordingly, the combinations of the geometrical arrangements of the grooves 121, 122, 123, that form the network are not limited to the exemplary patterns that are expressly depicted or described in words as disclosed herein.

As schematically shown in FIGS. 3, 4, 7, 8 and 9 for example, several passages 124 are defined through the inner ring 102. Desirably, as schematically shown in FIG. 4 for example, each of a plurality of the passages 124 defined through the inner ring 102 extends along a line that deviates by about 7° from a radial line from the central axis 106. The degree of this angular deviation depends upon the requirements of the machine that drills the passage 124 and the space that is required in order to enable this machine to address the undercut channels 127, 129 and drill the passage 124. The larger the diameter of the inner ring 102, the smaller the angular deviation from the radial line until at a certain diameter of the inner ring 102 and size requirements of the drilling machine, there will be no angular deviation and the passages 124 will extend along a radial line from the central axis 106. As schematically shown in FIG. 4 for example, one end of each passage 124 of this plurality of passages 124 defines an inner opening 131 through the inner surface 112 of the inner ring 102. As schematically shown in FIG. 8 for example, the inner opening 131 of each passage 124 is disposed in fluid communication with at least one of the grooves 121, 122, 123 of the network of interconnected grooves defined in one of the cylindrical outer surface 101 of the support pin 96 and the cylindrical inner surface 125 of the inner ring 102.

As schematically shown in FIG. 4 for example, one end of each passage 124 defines an outer opening 132 through the outer surface 113 of the inner ring 102. As schematically shown in FIGS. 2, 3, 4, 7 and 8 for example, each of the outer openings 132 of each of a plurality of the passages 124 is disposed in fluid communication with a respective one of the tracks defined in the outer surface 113 of the inner ring 102. As schematically shown in FIGS. 4 and 8 for example, the outer opening 132 of at least one passage 124 (and desirably a plurality of passages 124) is defined within at least one of the undercut channels 127, 129 of each track defined in the outer surface 113 of the inner ring 102 and thus is disposed in fluid communication with at least one of the tracks defined in the outer surface 113 of the inner ring 102. As schematically shown in FIG. 9 for example, the outer opening 132 of at least one passage 124 (and desirably a plurality of passages 124) is disposed in fluid communication with the exterior surface 128 of at least one of the guiderails 108 defined in the outer surface 113 of the inner ring 102. Depending upon the application and design specifications, in any given embodiment, all of the outer openings 132 of all of the passages 124 can be directly connected to the undercut channels 127, 129 or all of the outer openings 132 of all of the passages 124 can be directly connected to the exterior surfaces 128 of the guiderails 108 or just some of the openings 132 can be connected to the undercut channels 127, 129 while some of the openings 132 can be connected to the exterior surfaces 128 of the guiderails 108.

As schematically shown in FIG. 4 for example, the inner openings 131 through the inner surface 112 of the inner ring 102 are arranged in a pattern that staggers each successive outer opening 132 on an alternating side of the track. Because each passage 124 through the inner ring 102 extends along an axis that forms a radius having one end on the central axis 106, the pattern of inner openings 131 in the inner surface 112 of the inner ring 102 as depicted in FIG. 4 also defines the pattern of outer openings 132 that exists at the outer surface 113 of the inner ring 102. Accordingly, the outer openings 132 through the outer surface 113 of the inner ring 102 also are arranged in a pattern that staggers each successive outer opening 132 on an alternating side of the track. This staggered pattern of the outer openings 132 of the passages 124 through the inner ring 102 serves to minimize the number of passages 124 while providing better circumferentially distributed oil flow that aids in the cooling of the planet bearing.

For the embodiment depicted, the planet roller bearing may be formed of any suitable material. For example, in at least certain exemplary embodiments, the roller bearing may be formed of a suitable metal material, such as a chrome steel or a high carbon chrome steel. Alternatively, in other exemplary embodiments, the planet roller bearing may include one or more components formed of a suitable ceramic material.

The planet gearbox with its planet bearing apparatus described herein has several advantages over the prior art. By employing an interconnected network of grooves 121, 122, 123 to improve the cooling efficacy of the oil flow that is provided to the inner ring 102 of the planet bearing, the oil flow received by the planet bearing can be put to more efficient use. This an interconnected network of grooves 121, 122, 123 serves to minimize the total amount of oil that is needed to lubricate and cool the planet bearing. By minimizing the flow of oil to the planet bearing, the losses suffered in the planetary gearbox are minimized, and the efficiency of the entire engine 10 thereby improves. Additionally, minimizing the flow of oil needed for cooling and lubrication of the planet bearing allows a reduction in the size of the entire oil system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A planet gearbox for connection to a carrier of an epicyclic gearing arrangement that has only a single input and a single output and that includes a sun gear and a ring gear surrounding the planet gearbox and the sun gear, the planet gearbox comprising:
   a support pin configured to be fixed to the carrier and defining a cylindrical outer surface that is radially equidistant from a central axis that extends in an axial direction, the support pin is further defined as a hollow cylinder by a cylindrical inner surface disposed opposite the cylindrical outer surface, the support pin includes a plurality of oil feed holes, each oil feed hole extending through the support pin between the inner and outer surfaces of the support pin and defining an exit opening at the outer surface of the support pin;
   an inner ring defining a cylindrical inner surface that is non-rotatably connected to the cylindrical outer surface of the support pin, the inner ring defining an outer surface that defines at least one track;
   a respective plurality of cylindrical rollers; wherein each track of the at least one track is defined in the outer surface of the inner ring and is configured to receive and rotatably guide therein the respective plurality of cylindrical rollers;
   an outer ring defining an inner cylindrical surface contacting each respective plurality of cylindrical rollers, the outer ring defining an outer cylindrical surface that defines a gear tooth surface that is configured to mesh with both the sun gear and the ring gear;
   for each respective track, a respective roller cage disposed between the inner ring and the outer ring; and
   a network of interconnected grooves defined in one of the cylindrical outer surface of the support pin and the cylindrical inner surface of the inner ring, wherein each oil feed hole through the support pin is disposed to intersect with the network of grooves.

2. The planet gearbox of claim 1, wherein the network of interconnected grooves includes at least one helically-shaped groove, which includes an axially extending groove that extends in a direction that is not parallel to the central axis.

3. The planet gearbox of claim 2, wherein the network of interconnected grooves includes a plurality of circumferentially extending grooves, at least one of the circumferentially extending grooves extending in a direction that is normal to the central axis.

4. The planet gearbox of claim 3, wherein at least one of the circumferentially extending grooves extends completely around the circumference of one of the cylindrical outer surface of the support pin and the cylindrical inner surface of the inner ring.

5. The planet gearbox of claim 3, wherein at least one of the helically-shaped grooves intersects a circumferentially extending groove interconnected on each end of the helically-shaped groove.

6. The planet gearbox of claim 5, wherein at least one of the circumferentially extending grooves extends completely around the circumference of one of the cylindrical outer surface of the support pin and the cylindrical inner surface of the inner ring.

7. The planet gearbox of claim 1, wherein the network of interconnected grooves includes a plurality of H-shaped grooves, each H-shaped groove including a circumferentially extending groove interconnected on each end of a respective axially extending groove that extends in a direction that is parallel to the central axis.

8. The planet gearbox of claim 1, wherein the network of interconnected grooves includes a plurality of axially extending grooves, each of the plurality of axially extending grooves extending in a direction that is parallel to the central axis.

9. The planet gearbox of claim 1, wherein the network of interconnected grooves includes a plurality of circumferentially extending grooves, each of the plurality of circumferentially extending grooves extending in a direction that is normal to the central axis.

10. The planet gearbox of claim 9, wherein at least one of the circumferentially extending grooves extends completely around the circumference of one of the cylindrical outer surface of the support pin and the cylindrical inner surface of the inner ring.

11. The planet gearbox of claim 1, wherein a plurality of passages are defined through the inner ring, one end of each passage defining an inner opening through the inner surface of the inner ring wherein the inner opening is disposed in fluid communication with at least one of the grooves of the network of interconnected grooves defined in one of the cylindrical outer surface of the support pin and the cylindrical inner surface of the inner ring.

12. The planet gearbox of claim 11, wherein each passage of the plurality of passages defined through the inner ring extends along a radial line from the central axis.

13. The planet gearbox of claim 11, wherein one end of each passage of the plurality of passages defines an outer opening through the outer surface of the inner ring, wherein the outer opening of each of the plurality of passages is disposed in fluid communication with a respective one of the tracks defined in the outer surface of the inner ring.

14. The planet gearbox of claim 1, wherein a plurality of passages are defined through the inner ring, wherein one end of each of the plurality of passages defines an outer opening through the outer surface of the inner ring, wherein each track includes a pair of guiderails, each guiderail including an exterior surface that extends continuously in the circumferential direction around the outer surface of the inner ring and radially outwardly from an annular raceway defined in the outer surface of the inner ring, each guiderail is defined in part by a sidewall that runs along one of two circumferentially extending extreme edges of the raceway, each sidewall extends radially between a respective extreme edge of the raceway and a respective one of the exterior surfaces of a respective guiderail, wherein the outer opening of at least one passage is disposed in fluid communication with the exterior surface of at least one of the guiderails defined in the outer surface of the inner ring.

15. The planet gearbox of claim 14, wherein one end of each of the plurality of passages defined through the inner ring defines an inner opening through the inner surface of the inner ring, and wherein the inner opening of at least one of the plurality of passages opens into at least one of the grooves of the network of interconnected grooves defined in the outer surface of the support pin.

16. The planet gearbox of claim 1, wherein a plurality of passages are defined through the inner ring, wherein one end of each of the plurality of passages defines an outer opening through the outer surface of the inner ring, wherein each track includes a pair of guiderails, each guiderail including an exterior surface that extends continuously in the circumferential direction around the outer surface of the inner ring and radially outwardly from an annular raceway defined in the outer surface of the inner ring, each guiderail is defined in part by a sidewall that runs along one of two circumferentially extending extreme edges of the raceway, each sidewall extends radially between a respective extreme edge of the raceway and a respective one of the exterior surfaces of a respective guiderail, wherein a respective undercut channel extends circumferentially around a respective extreme edge of the raceway and is defined between the respective extreme edge of the raceway and the respective sidewall extending from the respective extreme edge of the raceway, wherein the outer opening of at least one passage is defined within at least one of the undercut channels defined in the outer surface of the inner ring.

17. The planet gearbox of claim 16, wherein one end of each of the plurality of passages defined through the inner ring defines an inner opening through the inner surface of the inner ring, and wherein the inner opening of at least one of the plurality of passages opens into at least one of the grooves of the network of interconnected grooves defined in the outer surface of the support pin.

18. The planet gearbox of claim 1, wherein inner openings through the inner surface of the inner ring are arranged in a pattern that staggers each successive inner opening on an alternating side of each track of the at least one track.

19. A gas turbine engine comprising:
a longitudinal axis;
a fan including a plurality of blades extending radially from a hub and rotatable about the longitudinal axis;
a compressor disposed downstream from the fan;
a turbine disposed downstream of the compressor;
a rotatable input shaft mechanically coupling the compressor to rotate in unison with the turbine;
an epicyclic gearing arrangement that has only a single input and that includes a carrier, a sun gear rotatable about a central axis that is coincident with the longitudinal axis, a ring gear disposed circumferentially around the sun gear, at least one planet gearbox that is carried by the carrier and houses a planet gear rotatable with respect to the carrier about the central axis, wherein the at least one planet gear meshes with both the sun gear and the ring gear; and
an engine envelope surrounding the fan, the compressor, the turbine and the epicyclic gearing arrangement, wherein one of the ring gear and the carrier is non-rotatably coupled to the engine envelope; and
the planet gearbox further including:
a support pin configured to be fixed to the carrier and defining a cylindrical outer surface that is radially equidistant from the central axis that extends in an axial direction, the support pin is further defined as a hollow cylinder by a cylindrical inner surface disposed opposite the cylindrical outer surface, the support pin includes a plurality of oil feed holes, each oil feed hole extending through the support pin between the inner and outer surfaces of the support pin,
an inner ring defining an inner cylindrical surface that is non-rotatably connected to the cylindrical outer surface of the support pin, the inner ring defining an outer surface that defines at least one track, each track being configured to receive and rotatably guide therein a respective plurality of cylindrical rollers,
an outer ring defining an outer cylindrical surface that defines a gear tooth surface of the planet gear and that is configured to mesh with both the sun gear and the ring gear, the outer ring defining an inner cylindrical surface that is opposed to the outer cylindrical surface of the outer ring, a plurality of rollers disposed in each track of the inner ring, each roller being free to rotate about the central axis, each roller defining a cylindrical outer surface contacting both the inner ring and the inner cylindrical surface of the outer ring, and for each respective track, a respective roller cage disposed between the inner ring and the outer ring, wherein there is a close clearance between each roller cage and the inner ring, and a network of interconnected grooves defined in one of the cylindrical outer surface of the support pin and the cylindrical inner surface of the inner ring, wherein each oil feed hole through the support pin is disposed to intersect with the network of grooves.

20. The gas turbine engine of claim 19, wherein a plurality of passages are defined through the inner ring, one end of each passage defining an inner opening through the inner surface of the inner ring, wherein the inner opening of at least one of the plurality of passages is disposed in fluid communication with at least one of the grooves of the network of interconnected grooves defined in one of the cylindrical outer surface of the support pin and the cylindrical inner surface of the inner ring.

* * * * *